US012715987B2

(12) United States Patent
Xu et al.

(10) Patent No.: US 12,715,987 B2
(45) Date of Patent: Aug. 25, 2026

(54) HIGHLY INSULATED RUBBER COMPOSITION, PROCESSING METHOD THEREFOR, AND USES THEREOF

(71) Applicant: HANGZHOU XINGLU TECHNOLOGIES CO., LTD., Hangzhou (CN)

(72) Inventors: Tao Xu, Hangzhou (CN); Zhi Sheng Fu, Hangzhou (CN); An Yang Wu, Hangzhou (CN)

(73) Assignee: HANGZHOU XINGLU TECHNOLOGIES CO., LTD, Hangzhou (CN)

(*) Notice: Subject to any disclaimer, the term of this patent is extended or adjusted under 35 U.S.C. 154(b) by 438 days.

(21) Appl. No.: 17/259,922

(22) PCT Filed: Jun. 25, 2019

(86) PCT No.: PCT/CN2019/092646
§ 371 (c)(1),
(2) Date: Jan. 12, 2021

(87) PCT Pub. No.: WO2020/011007
PCT Pub. Date: Jan. 16, 2020

(65) Prior Publication Data

US 2021/0292531 A1 Sep. 23, 2021

(30) Foreign Application Priority Data

Jul. 13, 2018 (CN) ........................ 201810771283.8

(51) Int. Cl.

| | |
|---|---|
| ***C08L 23/286*** | (2025.01) |
| ***C08K 5/14*** | (2006.01) |
| ***C08L 23/34*** | (2006.01) |
| *C08L 23/06* | (2006.01) |
| *C08L 23/16* | (2006.01) |

(52) U.S. Cl.
CPC .............. *C08L 23/286* (2013.01); *C08K 5/14* (2013.01); *C08L 23/34* (2013.01); *C08L 23/06* (2013.01); *C08L 23/16* (2013.01); *C08L 2203/202* (2013.01); *C08L 2205/02* (2013.01); *C08L 2205/03* (2013.01); *C08L 2205/08* (2013.01); *C08L 2207/062* (2013.01); *C08L 2207/066* (2013.01); *C08L 2207/07* (2013.01)

(58) Field of Classification Search
CPC .................................................... C08L 23/286
See application file for complete search history.

(56) References Cited

U.S. PATENT DOCUMENTS

| | | | | |
|---|---|---|---|---|
| 3,816,347 A * | 6/1974 | Luh | C08L 23/286 | 525/212 |
| 3,816,564 A * | 6/1974 | Holliday et al. | H01B 3/443 | 525/193 |
| 4,069,190 A * | 1/1978 | Vostovich | C08K 5/5425 | 428/390 |
| 4,482,681 A * | 11/1984 | Berta | C08K 3/24 | 528/421 |
| 4,632,954 A * | 12/1986 | Dalhuisen | C08K 5/18 | 524/204 |
| 4,732,925 A * | 3/1988 | Davis | C08K 3/04 | 524/427 |
| 4,751,147 A * | 6/1988 | Stephens | C08F 8/22 | 525/334.1 |
| 4,824,906 A * | 4/1989 | Honsberg | C08L 23/286 | 525/74 |
| 5,866,663 A * | 2/1999 | Brookhart | C08F 210/14 | 526/348 |
| 6,124,406 A * | 9/2000 | Cinadr | C08L 27/06 | 525/356 |
| 6,303,720 B1 * | 10/2001 | Mackenzie | C07D 233/56 | 502/122 |
| 6,417,260 B1 * | 7/2002 | Weng | C08K 5/12 | 524/297 |

(Continued)

FOREIGN PATENT DOCUMENTS

| | | |
|---|---|---|
| CN | 1768105 A | 5/2006 |
| CN | 101942151 A | 1/2011 |

(Continued)

OTHER PUBLICATIONS

CN103980595 (Year: 2014).*

(Continued)

*Primary Examiner* — Irina Krylova
(74) *Attorney, Agent, or Firm* — Ingrassia Fisher & Lorenz, LLP | IF&L

(57) ABSTRACT

Provided are a highly insulated rubber composition, a processing method therefor, and an application thereof. The rubber composition comprises a rubber matrix and compounding components. In parts by weight, every 100 parts of said rubber matrix comprise: 50-95 parts of a chlorinated (and/or chlorosulfonated) polyethylene rubber, 5-50 parts of a highly branched polyethylene, and 0-30 parts of an ethylene propylene rubber; and, the branching degree of the highly branched polyethylene is not lower than 50 branches/1000 carbon atoms. The compounding components contain a vulcanization system. The rubber composition improves the electrical insulation performance of the chlorinated (and/or chlorosulfonated) polyethylene rubber, so that the rubber composition is more suitable for the applications with high requirements for electrical insulation.

20 Claims, No Drawings

(56) References Cited

U.S. PATENT DOCUMENTS

| | | | | |
|---|---|---|---|---|
| 11,242,450 | B2 * | 2/2022 | Xu | C08K 3/013 |
| 11,479,661 | B2 * | 10/2022 | Xu | E01D 19/041 |
| 11,499,041 | B2 * | 11/2022 | Xu | C08K 5/34924 |
| 2006/0189759 | A1 | 8/2006 | Walther et al. | |
| 2011/0305859 | A1 * | 12/2011 | Laakso, Jr. | B32B 7/12<br>524/517 |
| 2015/0357080 | A1 * | 12/2015 | Fujita | C08L 23/06<br>524/436 |
| 2017/0015796 | A1 | 1/2017 | Van Duin et al. | |
| 2017/0278593 | A1 * | 9/2017 | Esseghir | H01B 7/0208 |
| 2019/0330456 | A1 * | 10/2019 | Xu | C08K 5/0016 |

FOREIGN PATENT DOCUMENTS

| | | | |
|---|---|---|---|
| CN | 102827429 | A | 12/2012 |
| CN | 103540044 | A | 1/2014 |
| CN | 105873996 | A | 8/2016 |
| JP | 2009013296 | A | 1/2009 |

OTHER PUBLICATIONS

CN103980596 translation (Year: 2014).*
CN106589181 original (Year: 2017).*
CN106589181 translation (Year: 2017).*
SIPO, International Search Report issued in IA No. PCT/CN2019/092646, mailed Sep. 27, 2019.

* cited by examiner

HIGHLY INSULATED RUBBER COMPOSITION, PROCESSING METHOD THEREFOR, AND USES THEREOF

CROSS REFERENCE TO RELATED APPLICATIONS

The present application is the U.S. national phase of and claims priority to International Patent Application No. PCT/CN2019/092646 filed Jun. 25, 2019, which claims the benefit of priority from China National Application No. 201810771283.8, filed on Jul. 13, 2018, the entire content of which is incorporated herein by reference into the present disclosure as if fully set forth herein.

TECHNICAL FIELD

The present invention belongs to the technical field of rubber, and specifically to a highly insulated rubber composition, a processing method therefor, and uses thereof.

RELATED ART

A chlorinated (and/or chlorosulfonated) polyethylene rubber is a polar special rubber having excellent oil resistance, fire resistance, and chemical stability, and is mainly used in the field of wire and cable. However, due to the poor electrical insulation performance, the chlorinated (and/or chlorosulfonated) polyethylene rubber is not well suitable foruse in the applications with high requirements for electrical insulation. To resolve the technical problem, the prior art generally improves the electrical insulation performance of the chlorinated (and/or chlorosulfonated) polyethylene rubber by using an ethylene propylene rubber together. Although ethylene-propylene monomer (EPM) has better electrical insulation performance than that of ethylene propylene diene monomer (EPDM), but because of its slow vulcanization speed and low mechanical strength, the technical solution of using EPDM together is generally adopted. However, EPDM has high raw material costs and process costs, and hence the technical solution still has space and requirements for optimization.

SUMMARY

For resolving the problems existing in the prior art, the present invention provides a rubber composition, which can improve electrical insulation performance and costs. A technical solution of the present invention is to replace a part of or all of the ethylene propylene rubber with a highly branched polyethylene having a fully saturated molecular structure and a simple production process, and use in combination with a chlorinated (and/or chlorosulfonated) polyethylene rubber, to improve the electrical insulation performance.

In a technical solution of the present invention, provided is a rubber composition, comprising a rubber matrix and compounding components. In parts by weight, every 100 parts of said rubber matrix comprise: 50-95 parts of a chlorinated (and/or chlorosulfonated) polyethylene rubber, 5-50 parts of a highly branched polyethylene, and 0-30 parts of an ethylene propylene rubber. The branching degree of the highly branched polyethylene is not lower than 50 branches/1000 carbon atoms; and said compounding components comprise a vulcanization system.

In a further technical solution, the chlorinated (and/or chlorosulfonated) polyethylene rubber is preferably used in an amount of 50-90 parts, and further preferably 60-80 parts, based on 100 parts of the rubber matrix; and the highly branched polyethylene is preferably used in an amount of 10-50 parts, and further preferably 20-40 parts, based on 100 parts of the rubber matrix.

The highly branched polyethylene used in the present invention is a kind of ethylene homopolymer having a branching degree of not less than 50 branches/1000 carbon atoms, which may also be referred to as Branched Polyethylene or Branched PE. Currently, Branched PE is mainly synthesized by homopolymerizing ethylene following a "chain walking mechanism" in the presence of a late transition metal catalyst, where the late transition metal catalyst is preferably an (α-diimine) nickel/palladium catalyst. The nature of the chain walking mechanism refers to the fact that a β-hydrogen elimination reaction and a re-insertion reaction tend to occur in the polymerization of an olefin in the presence of a late transition metal catalyst, for example, an (α-diimine)nickel/palladium catalyst, thereby causing branching. The branches pendant to the backbone of such highly branched polyethylene may have different numbers of carbon atoms, and specifically 1 to 6 or more carbon atoms.

The production cost of an (α-diimine) nickel catalyst is significantly lower than that of an (α-diimine) palladium catalyst, and is thus more suitable for industrial applications. Therefore, in the present invention, an (α-diimine) nickel catalyst is preferably used in the production of a highly branched polyethylene through catalytic polymerization of ethylene.

The highly branched polyethylene used in the present invention has a branching degree of not less than 50 branches/1000 carbon atoms, and a weight average molecular weight of not less than 66,000; further preferably has a branching degree of 60-130 branches/1000 carbon atoms, and a weight average molecular weight of 66,000-518,000; further preferably, has a branching degree of 70-120 branches/1000 carbon atoms, and a weight average molecular weight of 82,000-436,000; further preferably, has a branching degree of 82-105 branches/1000 carbon atoms, and a weight average molecular weight of 82,000-356,000; and also has a Mooney viscosity ML(1+4) at 125° C. of preferably 6-102, further preferably 12-93, and further preferably 42-80.

The ethylene propylene rubber used in the present invention is EPM or EPDM, and preferably EPDM. A third monomer of the EPDM can be specifically selected from the group consisting of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylene-2-norbornene, 1,5-cyclooctadiene, 1,4-cyclooctadiene, and the like, and is preferably at least one of 5-ethylidene-2-norbornene, 5-vinyl-2-norbornene, dicyclopentadiene, and 1,4-hexadiene.

A polyethylene raw material used for preparing the chlorinated (and/or chlorosulfonated) polyethylene in the present invention may be selected from at least one of a high density polyethylene, a low density polyethylene, and a highly branched polyethylene.

In a further technical solution, to improve compatibility of the rubber matrix, the rubber matrix further comprises, in parts by weight per 100 parts, 1-20 parts of a compatibilizer, which is a reaction product of an ethylene propylene rubber or a highly branched polyethylene through polarization modification. Polar monomers used in the polarization modification comprise at least one of maleic anhydride (MAH), methacrylic acid (MA), itaconic acid (IA), fumaric acid (FA), isocyanate, glycidyl methacrylate (GMA), methyl methacrylate (MMA), dibutyl fumarate (DBF), β-hydroxyethyl methacrylate (HEMA), dibutyl maleate (DBM), diethyl maleate (DEM), elemental halogen, a halogen-containing compound, a sulfur-containing compound, vinyl trimethoxysilane (VTMS), vinyltriethoxysilane (VTES), 3-methacryloxypropyl trimethoxysilane (VMMS), styrene (St), α-methylstyrene (α-MSt), and acrylonitrile (AN).

The compatibilizer of the present invention is preferably a low chlorinated polyethylene (LCPE) with a chlorine content less than that of the chlorinated (and/or chlorosulfonated) polyethylene rubber, wherein the chlorine content is 2%-20%, and preferably is 5%-15%. A raw material for preparing the LCPE may be a conventional high density polyethylene or low density polyethylene for preparing the chlorinated (and/or chlorosulfonated) polyethylene rubber, or may be the highly branched polyethylene used in the present invention, and the polyethylene raw material for preparing the LCPE is preferably the highly branched polyethylene. The compatibilizer LCPE with the highly branched polyethylene as a raw material generally has better compatibilizing effect on a high-polar chlorinated (and/or chlorosulfonated) polyethylene with a non-polar ethylene propylene rubber or a highly branched polyethylene than the compatibilizer LCPE with a conventional high density polyethylene or low density polyethylene as a raw material.

In a further technical solution, the vulcanization system in the rubber composition of the present invention may be selected from at least one of a peroxide vulcanization system, a thiourea vulcanization system, a thiadiazole vulcanization system, a triazole dimercapto-amine salt vulcanization system, a metal-oxide vulcanization system, an epoxy resin vulcanization system, a maleimide vulcanization system, a radiation vulcanizing sensitizing system and the like, and preferably selected from at least one of the peroxide vulcanization system, the thiourea vulcanization system, the metal-oxide vulcanization system, and the radiation vulcanizing sensitizing system.

The peroxide vulcanization system contains a peroxide crosslinking agent and an auxiliary crosslinking agent. In a further technical solution, based on 100 parts by weight of the rubber matrix, the peroxide crosslinking agent is used in an amount of 1-10 parts, and the auxiliary crosslinking agent is used in an amount of 0.2-20 parts. The peroxide crosslinking agent includes at least one of di-tert-butyl peroxide, dicumyl peroxide, tert-butyl cumyl peroxide, 1,1-di(tert-butylperoxy)-3,3,5-trimethylcyclohexane, 2,5-dimethyl-2,5-di(tert-butylperoxy) hexane, 2,5-dimethyl-2,5-di(tert-butylperoxy)-3-hexyne, bis(tert-butyl-peroxyisopropyl) benzene (BIBP), 2,5-dimethyl-2,5-di(benzoylperoxy) hexane (DBPMH), tert-butyl peroxybenzoate, and tert-butylperoxy-2-ethylhexyl carbonate, and the auxiliary crosslinking agent contains at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene glycol dimethacrylate, N,N'-m-phenylene bismaleimide (HVA-2), N,N'-bis(furfurylidene)acetone, 1,2-polybutadiene, p-quinone dioxime, sulfur, and metal salts of unsaturated carboxylic acids, where the metal salts of unsaturated carboxylic acids include at least one of zinc acrylate, zinc methacrylate (ZDMA), magnesium methacrylate, calcium methacrylate, and aluminum methacrylate. By adding a proper amount of the metal salts of unsaturated carboxylic acids, such as ZDMA, the vulcanizationperformance and the physical and mechanical properties of a vulcanized rubber can be improved effectively, especially the tensile strength.

The thiourea vulcanization system is composed of thiourea and sulfur, where the thiourea may be selected from ethylthiourea or ethylene thiourea.

The thiadiazole vulcanization system and the triazole dimercaptoamine salt vulcanization system are useful for vulcanizing the rubber composition having a rubber matrix with a high halogen content. The thiadiazole vulcanization system is composed of a crosslinking agent and an accelerating agent. The crosslinking agent is mainly a thiadiazole derivative crosslinking agent, such as ECHO.A, ECHO., TDD, PT75, TDDS, or the like, and the common accelerating agent is Vanax808, EataAccelDH, NC, Acce1903, BF, or the like. In addition, an amount of an acid absorbent, such as magnesium oxide or ultrafine magnesium hydroxide, is added.

The triazole dimercaptoamine salt vulcanization system is a single substance incorporating the effective groups of a thiadiazole vulcanizing agent and an accelerating agent (the condensate of n-butyraldehyde and aniline), which overcomes the disadvantages of the irregular distribution of bonds in the crosslinked rubber caused by thiadiazole and an accelerating agent, so that the rubber crosslinked body becomes a stable structure. Compared with the thiadiazole system, by introducing special groups, the salt also changes the PH of the system from strong acidity to neutral, thereby eliminating the adverse effects of an acidic filler on the system, making the rubber more chemically active during crosslinking. Therefore, the rubber crosslinked by the system has a substantial improvement in physical or chemical properties. It is suitable for low-temperature, no-pressure and low-pressure vulcanizing process conditions, has a fast vulcanizing speed, a small adding amount, and does not decompose at a vulcanizing temperature, has no odor, and is environmentally-friendly and nontoxic. Representative products are the vulcanizing agent FSH, and the crosslinking agent TEHC.

The metal-oxide vulcanization system is suitable for a rubber composition containing chlorosulfonated polyethylene, comprising zinc oxide, and further comprising magnesium oxide and stearic acid, where the magnesium oxide functions as an antiscorching agent, and the stearic acid can assist in dispersing the metal oxide and adjusting the vulcanizing speed.

The main component of the radiation vulcanizing sensitizing system is a radiation sensitizing agent, which may be selected from triallyl cyanurate, triallyl isocyanurate, ethylene glycol dimethacrylate, triethylene glycol dimethacrylate, and trimethylolpropane trimethacrylate, and the like. The radiation vulcanizing sensitizing system is particularly suitable for the wire and cable applications which have requirements on electrical insulation performance or medical rubber products which have high requirements on material cleanliness.

In a further technical solution, in the rubber composition of the present invention, based on 100 parts by weight of the rubber matrix, the compounding components further comprise 10-200 parts of a reinforcing filler, 0-80 parts of a plasticizer, 3-30 parts of a metal oxide, 0-3 parts of stearic acid, 0-15 parts of a surface modifier, 1-15 parts of a stabilizer, 0-150 parts of a flame-retardant agent, and 0-20 parts of a foaming agent.

In a further technical solution, the reinforcing filler contains at least one of carbon black, white carbon black, calcium carbonate, calcined clay, talcum powder, magnesium silicate, aluminum silicate, magnesium carbonate, titanium dioxide, montmorillonite, staple fiber, kaolinite, and bentonite.

In a further technical solution, the plasticizer contains at least one of pine tar, engine oil, naphthenic oil, paraffin oil, aromatic oil, liquid 1,2-polybutadiene, liquid polyisobutylene, ethyleneglycol dimethacrylate, liquid ethylene propylene rubber, coumarone, RX-80, stearic acid, paraffin, chlorinated paraffin, dioctyl adipate, dioctyl sebacate, epoxidized soybean oil, dibutyl phthalate, dioctyl phthalate, di-iso-decyl phthalate, di(tridecyl) phthalate, and trioctyl trimellitate. To increase the adhesion, preferably, a plasticizers with a tackifying effect, such as pine tar, coumarone, RX-80, liquid polyisobutylene, and ethyleneglycol dimethacrylate, can also be used. To improve cold resistance, preferably, dioctyl adipate, dioctyl sebacate, and dioctyl phthalate can be used. For the halogen-containing rubber matrix, epoxidized soybean oil can be used to stabilize the rubber matrix during processing.

In a further technical solution, the metal oxide comprises at least one of zinc oxide, magnesium oxide, aluminum oxide, lead oxide, and calcium oxide. The metal oxide can assist crosslinking, and absorb hydrogen chloride or hydrogen bromide.

In another technical solution, the stabilizer is selected from 2,2,4-trimethyl-1,2-dihydroquinoline polymer (RD), 6-ethoxy-2,2,4-trimethyl-1,2-dihydroquinoline (AW), 2-mercaptobenzimidazole (MB), N-phenyl-N'-cyclohexyl-p-phenylenediamine (4010), N-isopropyl-N'-phenyl-p-phenylenediamine (4010NA), and N-(1,3-dimethyl)butyl-N'-phenyl-p-phenylenediamine (4020), and the like. For the rubber composition comprising the rubber matrix with a high halogen content, the stabilizer can further be selected from basic lead salt compounds, metallic soap compounds, organic tin compounds, epoxy compounds, phosphite ester compounds, polyol compounds and the like, wherein the basic lead salt compounds are selected from lead stearate, dibasic lead titanate, basic lead silicate, lead phthalate and the like.

In a further technical solution, the flame-retardant agent includes at least one of pentaerythritol, ammonium polyphosphate, triethyl phosphate, aluminum hydroxide, magnesium hydroxide, zinc borate, antimonous oxide, zinc stearate, titanate, decabromodiphenylether, silane coupling agent-modified hydroxide, and red phosphorus. The aluminum hydroxide, the magnesium hydroxide, and the silane coupling agent-modified hydroxide are respectively nano aluminum oxide, nano magnesium hydroxide, and silane coupling agent-modified nano hydroxide, and the red phosphorus is a microencapsulated red phosphorus.

In a further technical solution, the surface modifier contains at least one of polyethylene glycol, diphenyl silanediol, triethanolamine, a silane coupling agent, and a titanate coupling agent.

In a further technical solution, the foaming agent comprises at least one of sodium bicarbonate, azodicarbonamide (AC), dinitrosopentylenetetramine (H), 4,4'-oxydibenzenesulfonyl hydrazide (OBSH), benzenesulfonyl hydrazide (BSH), urea, and a microencapsulated foaming agent containing a low-boiling point hydrocarbon.

The rubber composition of the present invention can exist in the form of an uncrosslinked rubber mix, and can exist in the form of a vulcanized rubber after a further crosslinking reaction. The vulcanized rubber may also be simply referred to as a vulcanizate.

The present invention further provides a method A for processing the foregoing rubber composition into a rubber mix by using a remixing method, the method A comprising the following steps:

(1) setting the temperature and rotor speed of an internal mixer;
(2) adding the components other than the vulcanization system in compounding system to the internal mixer sequentially in the order of dry agents and liquid agents;
(3) adding the components of the rubber matrix to the internal mixer;
(4) after the mixing power is stable, adding the vulcanization system, mixing and then discharging a rubber mix; and
(5) plasticating the rubber mix on an open mill or a multi-roll calender to a sheet, unloading, cooling down, and allowing the sheet to stand for 24 h, and then remixing and discharging the sheet.

After the sheet is discharged, the sample preparation and performance tests are preformed according to test standards.

When the Mooney viscosities of different components in the rubber matrixare significantly different, the present invention further provides another method B of processing the above-mentioned rubber composition. Specifically, the method comprises dividing the components of the rubber matrix into at least two groups by using a master batch method, each group being made into a master batch with an equivalent Mooney viscosity according to steps 1-3 in the method A, then adding each of the master batches to an internal mixer or an open mill for mixing, then adding the vulcanization system, evenly mixing, and then plasticating and unloading.

The present invention further provides a wire or a cable, having an insulating layer that uses an insulating rubber comprising the above rubber composition. Common wires and cables may be selected from two-core parallel wires, three-core parallel wires, or rubber sheathed flexible cables mainly used for an air conditioner wires. Further, the wires and cables are mainly selected from medium and low-voltage wires and cables. Specifically, the wires and cables may be a medium-sized rubber sheathed flexible cable.

The present invention further provides a wire or cable, having a sheathing layer that uses a rubber comprising the above rubber composition. Common wires and cables may be selected from two-core parallel wires, three-core parallel wires, or rubber sheathed flexible cables mainly used for air conditioner. Further, the wires and cables may be selected from mine cables, marine cables, rubber sheathed wires for household appliances, flexible cables for electrical apparatus, flame-retardant rubber sheathed wires for construction, automobile ignition wires, and cables for welding machines, and may be further selected from wires and cables used in other applications which require flame-retardancy, oil resistance, and weather resistance, for example, medium and heavy rubber sheathed flat cables for cranes, elevators, and railcars for transporting coal to power stations.

The present invention has the following beneficial effects:

1. The electrical insulation performance of the chlorinated (and/or chlorosulfonated) polyethylene may be improved in a low-cost manner, and the obtained rubber composition is more suitable for use in the applications with high requirements for electrical insulation; and
2. The rubber composition of the present invention is also superior to the chlorinated (and/or chlorosulfonated) polyethylene rubber in terms of compression set resistance, low-temperature resistance, and mechanical strength. Therefore, compared with the prior art, the rubber composition of the present invention can be more suitable for use in the applications that have high requirements for these properties.

DETAILED DESCRIPTION

The following examples are given to further illustrate the present invention, and not intended to limit the scope of the present invention. Some non-essential improvements and modifications made by the skilled person in the art based on the disclosure herein are still within the scope of the present invention.

The branched polyethylene raw material used in the examples are characterized by preferably having a branching degree of 50-130 branches/1000 carbon atoms, a weight average molecular weight of $6.6\times10^4$-$53.4\times10^4$ g/mol, and a Mooney viscosity ML(1+4) at 125° C. of 6-105. The branching degree is measured by 1H NMR, and the molar percentages of various branches are measured by 13C NMR.

The branched polyethylene raw material is further selected from the following table:

| Branched-polyethylene # | Branchingdegree | Methylcontent/% | Ethylcontent/% | Propylcontent/% | Butylcontent/% |
|---|---|---|---|---|---|
| PER-1 | 130 | 46.8 | 18.3 | 8.3 | 6.7 |
| PER-2 | 120 | 49.2 | 17.9 | 8.2 | 6.1 |
| PER-3 | 112 | 52.4 | 16.2 | 7.6 | 5.6 |
| PER-4 | 105 | 54.0 | 13.7 | 6.4 | 5.3 |
| PER-5 | 102 | 56.2 | 12.9 | 6.2 | 5.2 |
| PER-6 | 99 | 59.6 | 11.6 | 5.8 | 4.9 |
| PER-7 | 97 | 60.5 | 10.8 | 5.7 | 4.7 |
| PER-8 | 90 | 62.1 | 9.4 | 5.4 | 4.6 |
| PER-9 | 82 | 64.2 | 8.7 | 5.3 | 4.2 |
| PER-10 | 72 | 67.1 | 6.2 | 3.7 | 4.1 |
| PER-11 | 70 | 66.5 | 7.2 | 4.6 | 3.2 |
| PER-12 | 60 | 68.1 | 7.1 | 4.2 | 2.7 |
| PER-13 | 50 | 69.2 | 7.1 | 3.9 | 2.5 |

| Branched-polyethylene # | Amylcontent/% | Hexyl and longer branches content/% | Weight average molecular weight/× 10,000 | Molecular weight Distribution | Mooney viscosity ML(1 + 4) 125° C. |
|---|---|---|---|---|---|
| PER-1 | 5.2 | 14.7 | 6.6 | 2.2 | 6 |
| PER-2 | 5.1 | 13.5 | 8.2 | 2.1 | 12 |
| PER-3 | 4.9 | 13.3 | 22.5 | 1.9 | 32 |
| PER-4 | 5.1 | 15.5 | 26.8 | 2.1 | 42 |
| PER-5 | 4.9 | 14.6 | 27.9 | 2.1 | 52 |
| PER-6 | 5.1 | 13.0 | 28.3 | 1.8 | 63 |
| PER-7 | 4.9 | 13.3 | 34.8 | 2.0 | 65 |
| PER-8 | 4.5 | 14.0 | 32.1 | 2.1 | 77 |
| PER-9 | 3.9 | 13.7 | 35.6 | 1.7 | 80 |
| PER-10 | 3.3 | 15.6 | 15.8 | 1.9 | 20 |
| PER-11 | 3.2 | 15.3 | 43.6 | 2.1 | 93 |
| PER-12 | 2.8 | 15.1 | 51.8 | 2.2 | 102 |
| PER-13 | 2.6 | 14.7 | 53.4 | 2.3 | 105 |

The compatibilizer used in the examples of the present invention is chlorinated polyethylene with a low chlorine content, which is prepared by introducing chlorine gas into a hexane or carbon tetrachloride solution containing a branched polyethylene and a radical initiator (e.g., azodiisobutyronitrile), and controlling different reaction temperatures and times, to obtain different LCPEs.

Halogen-containing branched polyethylenes used in the examples of the present invention are selected from the following table:

| LCPE # | Branched polyethylene raw material # | Mass percentage of chlorine element/% |
|---|---|---|
| LCPE-1 | PER-5 | 5.3 |
| LCPE-2 | PER-7 | 12.9 |

The chlorinated polyethylene rubber used in the examples of the present invention has a chlorine content of 35%, and a Mooney viscosity ML(1+4) at 125° C. of 76; the chlorosulfonated polyethylene rubber used in the examples of the present invention has a chlorine content of 35%, a sulfur content of 1%, and a Mooney viscosity ML(1+4) at 125° C. of 43; and the EPDM used in the examples of the present invention has an ENB content of 4.5%, a Mooney viscosity ML(1+4) at 125° C. of 48, and an ethylene content of 55%.

Test Methods of Rubber Performances:

1. Tensile strength and elongation at break performance test: the test is performed by using an electronic tensile tester in accordance with the national standard GB/T528-2009, at a tensile speed of 500 mm/min and a test temperature of 23±2° C., with a type 2 dumbbell sample;
2. Mooney viscosity test: the test is carried out in accordance with the national standard GB/T1232.1-2000, with a Mooney viscosity meter at a test temperature set according to actual conditions by preheating for 1 minute, and the test is continued for 4 minutes;
3. Volume resistivity test: the test is performed by using a megger in accordance with the national standard GB/T1692-2008; and
4. Oxygen index test: the test is performed in accordance with the national standard GB/T2046.2-2009.

Examples 1-7 and Comparative Example 1

The rubber compositions of Examples 1-7 and Comparative example 1 have the compositions as shown in Table 1: (the parts by weight of the components based on 100 parts by weight ofthe rubber matrixare listed in the table)

TABLE 1

| Component | Comparative Example 1 | Example 1 | Example 2 | Example 3 | Example 4 | Example 5 | Example 6 | Example 7 |
|---|---|---|---|---|---|---|---|---|
| Amount of CM | 100 | 90 | 80 | 70 | 70 | 70 | | 50 |
| Amount of CSM | | | | | | | 60 | |
| PER # | | PER-6 | PER-9 | PER-5 | PER-5 | PER-5 | PER-3 | PER-7 |
| Amount of PER | | 10 | 20 | 30 | 15 | 25 | 32 | 40 |
| Amount of EPDM | | | | | 15 | | | |
| LCPE # | | | | | | LCPE-1 | LCPE-1 | LCPE-2 |
| Amount of LCPE | | | | | | 5 | 8 | 10 |
| MgO | 5 | 5 | 5 | 5 | 5 | 5 | 5 | 5 |
| White carbon black | 30 | 30 | 30 | 30 | 30 | 30 | 30 | 30 |
| Talcum powder | 20 | 20 | 20 | 20 | 20 | 20 | 20 | 20 |
| Dioctyl adipate | 15 | 15 | 15 | 15 | 15 | 15 | 15 | 15 |
| Paraffin | 1 | 1 | 1 | 1 | 1 | 1 | 1 | 1 |
| Chlorinated paraffin | 4 | 4 | 4 | 4 | 4 | 4 | 4 | 4 |
| Calcium stearate | 1 | 1 | 1 | 1 | 1 | 1 | 1 | 1 |
| Anti-aging agent RD | 1 | 1 | 1 | 1 | 1 | 1 | 1 | 1 |
| Silane coupling agent A-172 | 3 | 3 | 3 | 3 | 3 | 3 | 3 | 3 |
| Antimony oxide | 10 | 10 | 10 | 10 | 10 | 10 | 10 | 15 |
| Zinc borate | 5 | 5 | 5 | 5 | 5 | 5 | 5 | 10 |
| Aluminium hydroxide | 15 | 15 | 15 | 15 | 15 | 15 | 15 | 20 |
| DCP | 4 | 4 | 4 | 4 | 4 | 4 | 4 | 4 |
| TAIC | 2 | 2 | 2 | 2 | 2 | 2 | 2 | 2 |

The mixing processes of Examples 1-7 and Comparative example 1 were as follows:

The internal mixer was set to an initial temperature of 90° C. and a rotor speed of 40 rpm. All of the dry agents and liquid agents except for DCP and TAIC were added successively, and mixed for 3 min, and then the rubber matrix was added. After mixing power was stable, DCP and TAIC were added, and mixed for 1 min, and then a rubber mix was discharged. The rubber mix was then plasticated on an open mill to a sheet, unloaded and cooled down, and the sheet was allowed to stand for 24 h. After that, the sheet was remixed and discharged.

All tests were prepared and tested according to standards. The vulcanizing method was carried out by using mold pressing vulcanization, at a vulcanizing temperature of 170° C. and a pressure of 16 MPa for Tc 90+1 min, and the tests were performed after standing for 16 h. The performance data of the test samples were as shown in Table 2:

TABLE 2

| Performance | Comparative example 1 | Example 1 | Example 2 | Example 3 | Example 4 | Example 5 | Example 6 | Example 7 |
|---|---|---|---|---|---|---|---|---|
| Tensile strength/MPa | 16.3 | 16.8 | 17.3 | 17.5 | 17.1 | 17.8 | 18.2 | 19.5 |
| Elongation at break | 618 | 591 | 551 | 575 | 534 | 582 | 571 | 558 |
| Oxygen index/% | 33.8 | 33.2 | 32.1 | 31.6 | 31.5 | 31.7 | 30.6 | 33.4 |
| Volume resistivity/$10^{13}\Omega\cdot$cm | 1.9 | 2.1 | 2.8 | 3.7 | 3.6 | 3.6 | 4.2 | 5.7 |

It can be seen from the comparison between Examples 1-3 and Comparative example 1 that, with the increase in the content of the highly branched polyethylene, the volume resistivity of the rubber composition increases significantly, and electrical insulation performance is improved. It can be seen from the comparison between Example 3 and Example 4 that replacing the EPDM with the highly branched polyethylene can not only increase the volume resistivity, but also improve the overall mechanical strength. It can be seen form the comparison between Example 3 and Example 5 that by adding the compatilizer, the blending compatibility and mechanical strength of the rubber composition of the present invention can be effectively improved.

The rubber compositions of the above examples can be used as wire and cable sheathing materials having specific requirements on flame-retardant and insulating properties.

Examples 8-4 and Comparative Example 2

The rubber compositions of Examples 8-14 and Comparative example 2 have the compositions as shown in Table 3: (the parts by weight of the components based on 100 parts by weight of rubber matrix are listed in the table)

TABLE 3

| Example | Comparative Example 2 | Example 8 | Example 9 | Example 10 | Example 11 | Example 12 | Example 13 | Example 14 |
|---|---|---|---|---|---|---|---|---|
| Amount of CM | 100 | 95 | 85 | 70 | 70 | 60 | 50 | 50 |
| PER # | | PER-10 | PER-8 | PER-11/ PER-2 | PER-7 | PER-6 | PER-9/ PER-3 | PER-5 |
| Amount of PER | | 5 | 15 | 20/10 | 30 | 30 | 20/15 | 50 |
| LCPE # | | | | | | LCPE-1 | LCPE-2 | |
| Amount of LCPE | | | | | | 10 | 15 | |
| MgO | 10 | 10 | 10 | 10 | 10 | 10 | 10 | 10 |
| Aluminium hydroxide | 30 | 30 | 30 | 30 | 30 | 30 | 30 | 30 |
| Talcum powder | 20 | 20 | 20 | 20 | 20 | 20 | 20 | 20 |
| Calcined clay | 40 | 40 | 40 | 40 | 40 | 40 | 40 | 40 |
| Dioctyl sebacate | 30 | 30 | 30 | 30 | 30 | 30 | 30 | 30 |
| Zinc stearate | 1 | 1 | 1 | 1 | 1 | 1 | 1 | 1 |
| Calcium stearate | 1 | 1 | 1 | 1 | 1 | 1 | 1 | 1 |
| Antioxidant RD | 1 | 1 | 1 | 1 | 1 | 1 | 1 | 1 |
| BIBP | 4 | 4 | 4 | 4 | 4 | 4 | 4 | 4 |
| TAIC | 2.5 | 2.5 | 2.5 | 2.5 | 2.5 | 2.5 | 2.5 | 2.5 |

The mixing processes of Examples 8-14 and Comparative example 2 were as follows:

The internal mixer was set to an initial temperature of 90° C. and a rotor speed of 40 rpm. All of the dry agents and liquid agents except for BIP and TAC were added successively, and mixed for 3 m, and then the rubber matrix was added. After mixing power was stable, BTIBP and TAIC were added, and mixed for 1 min, and then the rubber mix was discharged. The rubber mix was then plasticated on an open mill to a sheet, unloaded and cooled down, and the sheet was allowed to stand for 24 h. After that, the sheet was remixed and discharged.

All tests were prepared and tested according to standards. The vulcanizing method was carried out by using mold pressing vulcanization, at a vulcanizing temperature of 165° C. and a pressure of 16 MPa for Tc 90+1 min, and the tests were performed after standing for 16 h. The performance data of the test samples were as shown in Table 4:

TABLE 4

| Performance | Comparative Example 2 | Example 8 | Example 9 | Example 10 | Example 11 | Example 12 | Example 13 | Example 14 |
|---|---|---|---|---|---|---|---|---|
| Tensile strength/MPa | 12.8 | 13.1 | 13.5 | 13.6 | 15.8 | 15.3 | 16.1 | 15.3 |
| Elongation at break | 532 | 546 | 528 | 517 | 525 | 561 | 557 | 498 |
| Volume resistivity/$10^{14}\Omega\cdot$cm | 3.7 | 3.8 | 4.6 | 6.2 | 6.1 | 7.3 | 8.2 | 8.8 |

It can be seen from the comparison that, with the increase in the content of the highly branched polyethylene, the volume resistivity of the rubber composition increases accordingly, and the electrical insulation performance is improved effectively. Therefore, the rubber composition is useful as an insulating layer material of the medium- and low-voltage wires and cables.

Although preferred embodiments of the present invention have been described herein, these embodiments are provided merely by way of examples. It is to be understood that variations of the embodiments of the present invention described herein can also be used in the practice of the present invention. It will be appreciated by those skilled in the art that various modifications, changes and substitutions can be made without departing from the scope of the present invention. It is to be understood that the scope of the present invention is defined by the appended claims, and the methods, structures, and equivalents thereof within the scope of the claims are also contemplated in the scope of the claims.

What is claimed is:

1. A rubber composition, comprising a rubber matrix and compounding components, wherein, in parts by weight, every 100 parts of the rubber matrix comprise:

60-80 parts of a chlorinated (and/or chlorosulfonated) polyethylene rubber, 20-40 parts of a highly branched polyethylene, and 0-30 parts of an ethylene propylene rubber;

wherein:

the compounding components comprise a radiation vulcanization sensitizing system comprising a radiation sensitizing agent selected from the group consisting of triallyl cyanurate, triallyl isocyanurate, ethylene glycol dimethacrylate, triethylene glycol dimethacrylate, and trimethylolpropane trimethacrylate;

the highly branched polyethylene is an ethylene homopolymer with a branching degree of from 97 branches/1000 carbon atoms to 102 branches/1000 carbon atoms, a weight average molecular weight of from 66,000 to 518,000, and a Mooney viscosity ML(1+4) at 125° C. of from 42-80; and the rubber composition after vulcanization exhibits a volume resistivity of from 6.0×10^14 Ωcm to 8.8×10^14 Ωcm.

2. The rubber composition according to claim 1, wherein:

the rubber matrix further comprises, based on 100 parts by weight of the rubber matrix, 8-10 parts of a low chlorinated polyethylene (LCPE) compatibilizer;

the LCPE compatibilizer has a chlorine content of 5% to 15%;

the LCPE compatibilizer is prepared from the same branched polyethylene ethylene homopolymer as comprised in the rubber matrix; and the compounding components further comprise, based on 100 parts by weight of the rubber matrix, 10-200 parts of a reinforcing filler, 0-80 parts of a plasticizer, 3-30 parts of a metal oxide, 0-3 parts of stearic acid, 0-15 parts of a surface modifier, 1-15 parts of a stabilizer, 0-150 parts of a flame-retardant agent, and 0-20 parts of a foaming agent.

3. The rubber composition according to claim 2, wherein:

the branching degree of the ethylene homopolymer is from 99 to 102 branches/1000 carbon atoms;

the reinforcing filler comprises at least one of aluminum hydroxide, calcined clay, talcum powder, and white carbon black; and the rubber composition after vulcanization exhibits the volume resistivity of from 7.0×10^14 Ωcm to 8.8×10^14 Ωcm.

4. The rubber composition according to claim 1, wherein the radiation sensitizing agent is the triallyl cyanurate.

5. The rubber composition according to claim 1, wherein the radiation sensitizing agent is the triallyl isocyanurate.

6. The rubber composition according to claim 1, wherein the radiation sensitizing agent is the ethylene glycol dimethacrylate.

7. The rubber composition according to claim 1, wherein the radiation sensitizing agent is the triethylene glycol dimethacrylate.

8. The rubber composition according to claim 1, wherein the radiation sensitizing agent is the trimethylolpropane trimethacrylate.

9. The rubber composition according to claim 1, wherein the highly branched polyethylene has the weight average molecular weight of from 82,000 to 356,000.

10. The rubber composition according to claim 1, wherein the highly branched polyethylene has the Mooney viscosity ML(1+4) at 125° C. of from 52-65.

11. The rubber composition according to claim 1, wherein the highly branched polyethylene is synthesized by homopolymerizing ethylene in the presence of an (α-diimine) nickel catalyst.

12. The rubber composition according to claim 1, wherein the ethylene propylene rubber is present and is an ethylene propylene diene monomer (EPDM) rubber, and wherein the diene monomer of the EPDM is at least one of 5-ethylidene-2-norbornene, 5-vinyl-2-norbornene, dicyclopentadiene, and 1,4-hexadiene.

13. The rubber composition according to claim 1, wherein the rubber matrix further comprises, in parts by weight per 100 parts of the rubber matrix, 1-20 parts of a compatibilizer, wherein the compatibilizer is a reaction product of an ethylene propylene rubber or a highly branched polyethylene through polarization modification.

14. The rubber composition according to claim 1, wherein the rubber matrix further comprises, in parts by weight per 100 parts of the rubber matrix, 1-20 parts of a low chlorinated polyethylene (LCPE) compatibilizer having a chlorine content of from 2% to 20%.

15. The rubber composition according to claim 1, wherein the rubber matrix further comprises, in parts by weight per 100 parts of the rubber matrix, 1-20 parts of a low chlorinated polyethylene (LCPE) compatibilizer, wherein a polyethylene raw material used for preparing the LCPE is the same highly branched polyethylene comprised in the rubber matrix.

16. The rubber composition according to claim 1, wherein the compounding components further comprise, based on 100 parts by weight of the rubber matrix, 10-200 parts of a reinforcing filler comprising at least one of carbon black, white carbon black, calcium carbonate, calcined clay, talcum powder, magnesium silicate, aluminum silicate, magnesium carbonate, titanium dioxide, montmorillonite, staple fiber, kaolinite, and bentonite.

17. The rubber composition according to claim 1, wherein the compounding components further comprise, based on 100 parts by weight of the rubber matrix, 0-80 parts of a plasticizer comprising at least one of pine tar, engine oil, naphthenic oil, paraffin oil, aromatic oil, liquid 1,2-polybutadiene, liquid polyisobutylene, ethylene glycol dimethacrylate, liquid ethylene propylene rubber, coumarone, stearic acid, paraffin, chlorinated paraffin, dioctyl adipate, dioctyl sebacate, epoxidized soybean oil, dibutyl phthalate, dioctyl phthalate, di-iso-decyl phthalate, di(tridecyl) phthalate, and trioctyl trimellitate.

18. The rubber composition according to claim 1, wherein the compounding components further comprise, based on 100 parts by weight of the rubber matrix, 3-30 parts of a metal oxide comprising at least one of zinc oxide, magnesium oxide, aluminum oxide, lead oxide, and calcium oxide.

19. The rubber composition according to claim 1, wherein the compounding components further comprise, based on 100 parts by weight of the rubber matrix, 1-15 parts of a stabilizer comprising at least one of 2,2,4-trimethyl-1,2-dihydroquinoline polymer, 6-ethoxy-2,2,4-trimethyl-1,2-dihydroquinoline, 2-mercaptobenzimidazole, N-phenyl-N'-cyclohexyl-p-phenylenediamine, N-isopropyl-N'-phenyl-p-phenylenediamine, and N-(1,3-dimethylbutyl)-N'-phenyl-p-phenylenediamine.

20. The rubber composition according to claim 1, wherein the compounding components further comprise, based on 100 parts by weight of the rubber matrix, 0-150 parts of a flame-retardant agent comprising at least one of pentaerythritol, ammonium polyphosphate, triethyl phosphate, aluminum hydroxide, magnesium hydroxide, zinc borate, antimonous oxide, zinc stearate, titanate, decabromodiphenylether, silane coupling agent-modified hydroxide, and red phosphorus.

* * * * *